US006860441B2

(12) United States Patent
Richardson

(10) Patent No.: US 6,860,441 B2
(45) Date of Patent: Mar. 1, 2005

(54) UTILITY FOOD GRATER

(76) Inventor: Michael Tyler Richardson, 3011 Deerfoot Trail, Huron, OH (US) 44839

( * ) Notice: Subject to any disclaimer, the term of this patent is extended or adjusted under 35 U.S.C. 154(b) by 175 days.

(21) Appl. No.: 10/238,084

(22) Filed: Sep. 10, 2002

(65) Prior Publication Data

US 2004/0046073 A1 Mar. 11, 2004

(51) Int. Cl.[7] ................................................ A47J 43/25
(52) U.S. Cl. ......................................... 241/95; 241/168
(58) Field of Search ....................... 241/95, 168, 169.2, 241/273.1, 273.4

(56) References Cited

U.S. PATENT DOCUMENTS

| | | | |
|---|---|---|---|
| 1,845,522 A | * 2/1932 | Rowley | ....................... 241/168 |
| D149,956 S | 6/1948 | Lataner | |
| 3,858,815 A | 1/1975 | Black | ......................... 241/168 |
| D389,019 S | 1/1998 | Molo | ........................... D7/678 |
| 5,711,491 A | * 1/1998 | Molo | ........................... 241/95 |

* cited by examiner

Primary Examiner—Lowell A. Larson
(74) Attorney, Agent, or Firm—Patrick J. Daugherty; Driggs, Lucas, Brubaker & Hogg Co., LPA

(57) ABSTRACT

A grater and method for grating, wherein a grating panel is connected to a handle with a gripping portion aligned behind the grating surface back side below the top end and above the bottom end and in a common plane with the directional vector, the gripping portion further forming an angle with the downward directional vector, the gripping portion vector angle less than 90 degrees. It is preferred that the angle is selected to translate forces normal to and against the grating surface front side into compressive forces against a user's hand gripping the handle gripping portion. In one embodiment, the connecting means is a steel rod disposed along the panel edge portions and projects from the panel top normal to the planar panel. Some embodiments have stand elements to enable the grater to stand upon a work-surface.

15 Claims, 8 Drawing Sheets

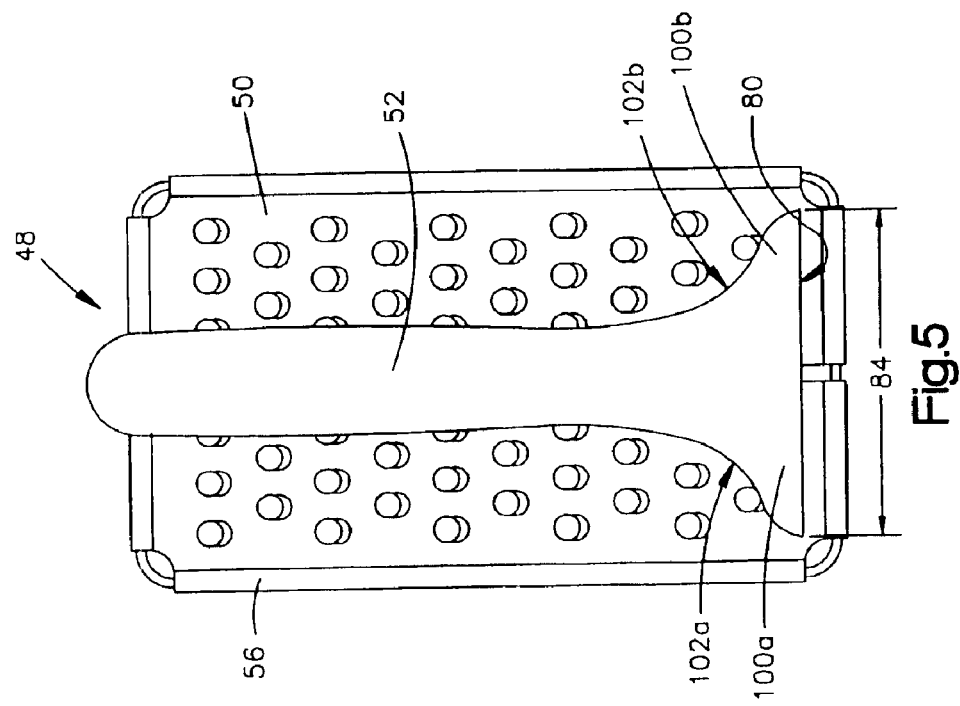
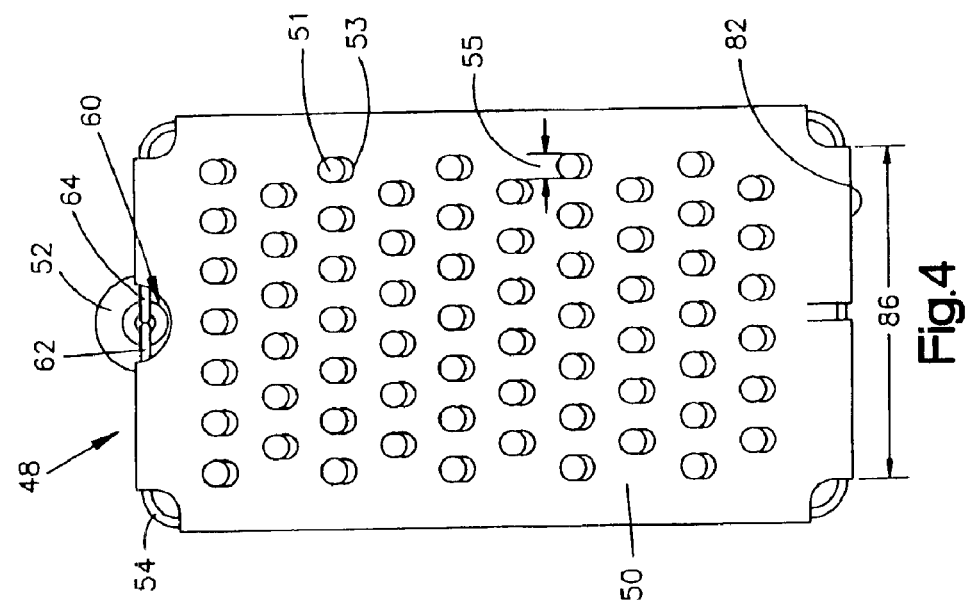

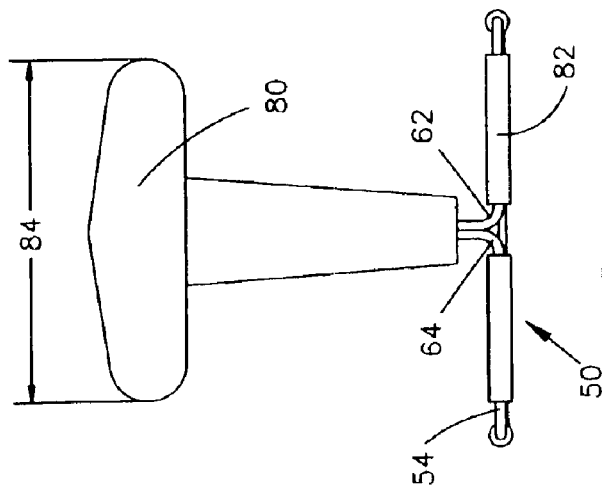
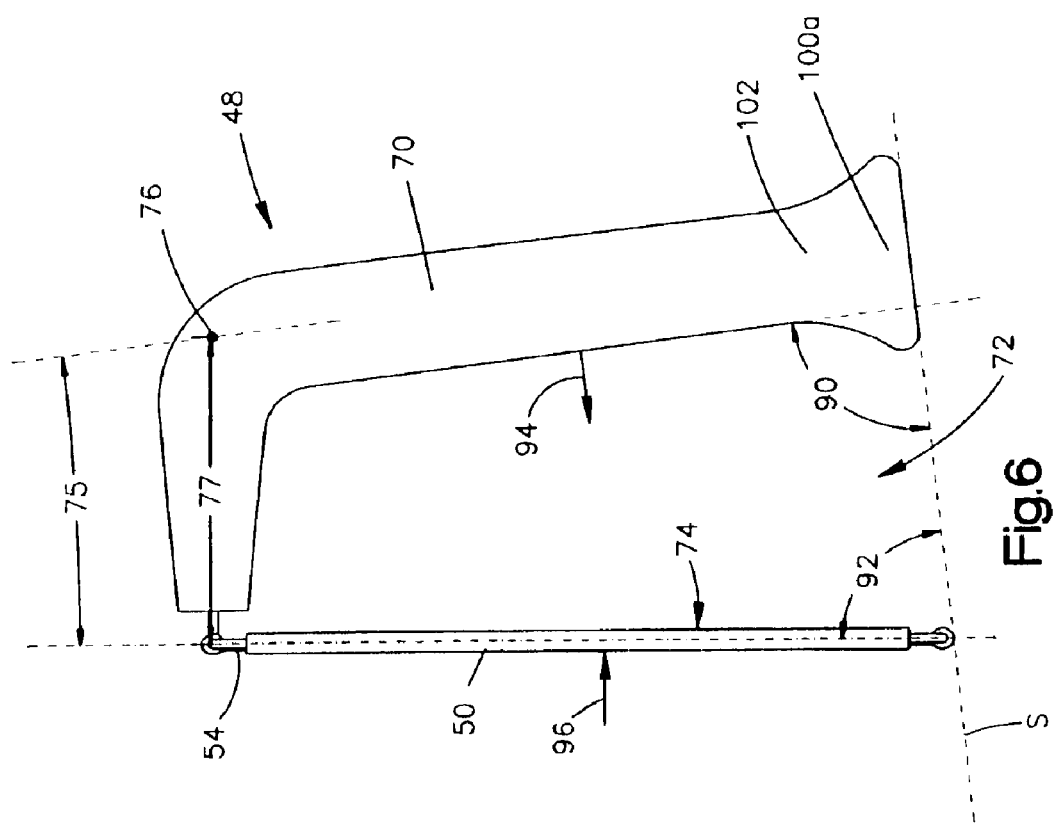

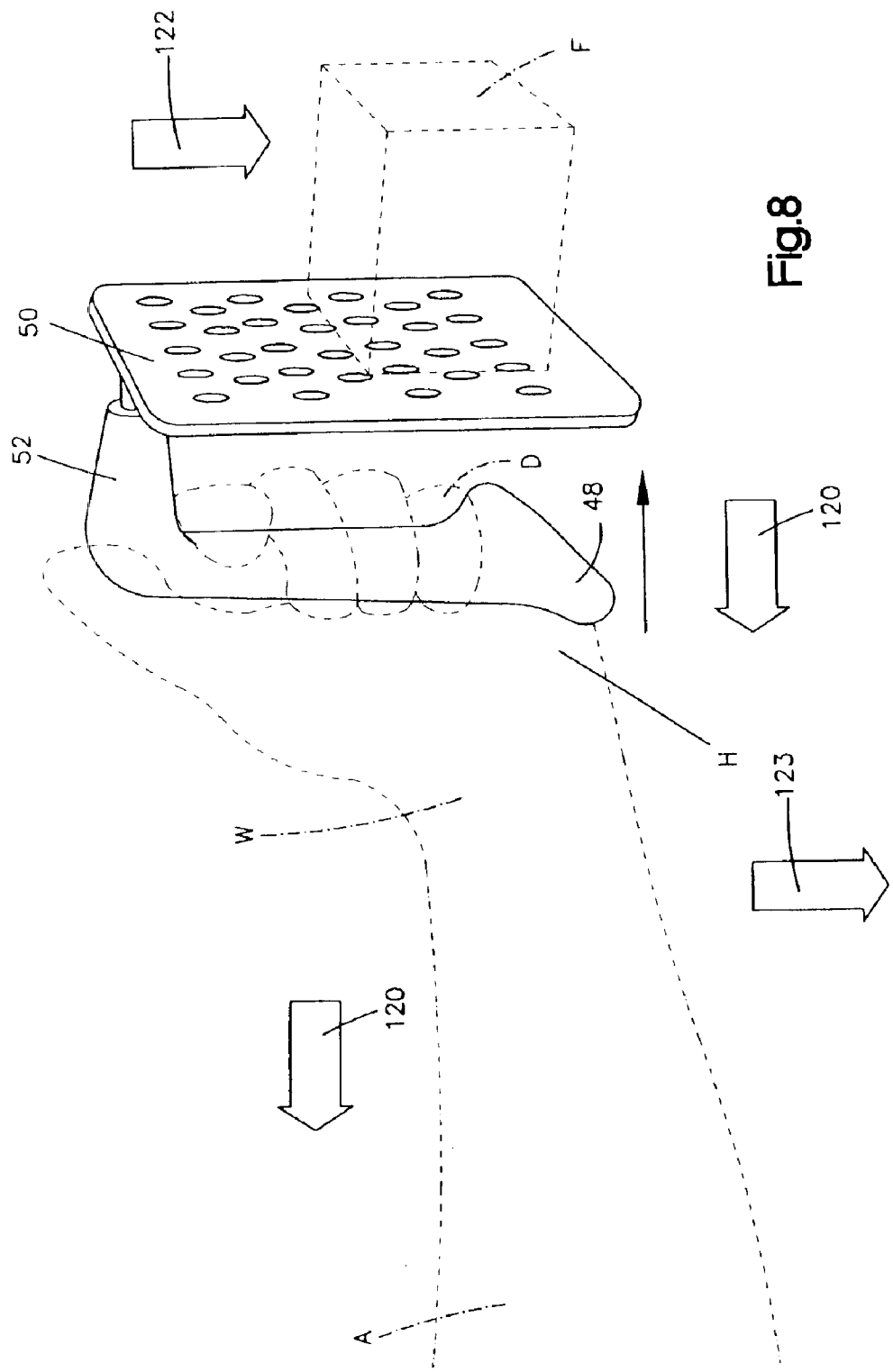

UTILITY FOOD GRATER

FIELD OF THE INVENTION

The present invention relates to hand tools and, in particular, to devices for use in food preparation, more particularly to food graters.

BACKGROUND OF THE INVENTION

Grating food products, such as cheese or vegetables, is not always an easy task. Typical prior art food graters can be uncomfortable and cumbersome to use. Prior art graters may be categorized into three basic styles. The first style is the "single flat panel style," which typically has a flat rectangular planar panel with grating elements defining a "grating area" and a handle attached to the top of the planar panel extending upward in the same plane. One example of this style is the Williams-Sonoma, Inc. "Stainless Steel Flat Grater." This grater style is typically used to grate food above a bowl or other distribution area, and is often rested on a work surface for additional support.

The second style is the "box style" grater. This style typically has three or four planar panels with grating elements, wherein the panels are connected to each other to form a four- or three-sided enclosure with a top end and an open bottom end. A handle or knob is typically attached to the top end. The panels usually each have a different style of grater cutting element surface, ranging from larger to smaller element dimensions as one compares the panels. An example of a four-sided grater of this style is the Central Restaurant Products, Inc. "Square Grater." An example of a three-sided grater of this style is the King Arthur Flour Company, Inc. ProGrip Ultra™ Grater. These styles can also be used suspended above a collection device, such as a bowl, but are normally used placed upon a work surface, such as a counter, a plate or a cutting board.

The third style is the mechanical rotary-style grater. This grater typically has a drum or disc mechanism with grating elements, and a handle-driven means of rotating the drum or disc. Food products are inserted into an intake structure and grated as they are pressed against the rotating drum or disc by another element, or as they are compelled against the rotating drum or disc by gravity. An example of such a grater wherein food products are compelled by user defined force against a drum is the Zyliss® "Multi-Purpose Rotary Grater." One in which gravity compels food products, such as spices, against a drum grater is the Zyliss® "Herb Mill."

All three types of prior art graters have disadvantages. With respect to the rotary-style, the size and shape of the food products that may be grated are limited by the size of the intake structure, which is usually a relatively small rectangular chute. Use of the gravity-feed style is also limited to small food products that freely pour through the chute to engage the drum. And both the mechanical and box style prior art graters are fairly difficult and time consuming to clean, the former as there are a lot of moving parts that need to be washed when finished, and the latter due to cumbersome access to the internal "boxed" area. Care must be taken to thoroughly clean a large variety of element areas that can trap food and cause bacteria to grow.

With respect to the "box" style, this grater is typically used with the open bottom end resting on a work surface, such as a counter, or a plate, cutting board or paper towel resting on a counter. However, by resting the bottom end on a work surface while grating food products, this surface must function as a collector for the grated food product. The work surface collector thus functions as an intermediary collector, which will be used to ultimately transfer the grated food product to another destination, such a pot or dinner plate. Dishes or cutting boards must be washed when finished, or paper towels must be thrown away, resulting in cumbersome inefficiencies. It is also inconvenient to grate some food product onto a first collector and then transfer the grated material into or onto a second receiving item, such as a dish or pot. For example, some soft cheeses, such as "Cheddar" or "Swiss" cheese, tend to "bunch up" and stick together after grating, requiring further separation and distribution steps in transferring to a pot or dish. Grating such food products directly to a dish or pot as they are grated would be preferred as it allows a more uniform distribution of grated product without additional preparation steps.

Moreover, grating food products with the prior art box-style grater bottom end resting on a work surface causes the grated product to accumulate within the enclosed "box" structure, in some cases filling the structure entirely where a large quantity of grated food product is required. Where the collection device is a countertop, not only is transferring the grated food product to a pot or dish required, but a user must also lift the box style grater very frequently to remove the grated food product as it accumulates and fills in the enclosed "boxed in area." This results in multiple steps of lifting the grater, separating and distributing a quantity of grated product, and repeating these steps until finished with the task. In this type of situation, it may be preferred to hold the box grater over a receiving dish or pot, unsupported by a work surface, while the food product is grated, thereby allowing the grated product to fall freely out of the bottom end and into the receiving device.

However, using either of the prior art flat panel or box styles without resting these devices on a work surface requires them to be held above a target area and fully supported by one hand, while the other hand holds the food product being grated. A problem with these prior art devices is that holding and using them unsupported results in discomfort and muscle fatigue. In fact, some users will not use prior art flat panel or box style graters unsupported by a work surface due to discomfort caused when holding the extended handle from the top and grating food products across the panel face.

The main reason for the discomfort lays in the basic design of the prior art flat panel and box style graters. The mechanics are basic in that when a food product, such as a chunk of cheese or a potato, is pressed against the grating surface, a force is developed. Referring now to FIG. 1, a prior art flat panel grater 10 is shown. The grater 10 has a flat planar grating panel 12, which has a plurality of grating elements 14. A handle 11 is attached to the top of and aligned in a common plane with the panel 12. As is well known in the art, each grating element 14 typically comprises an aperture 16 through the panel 12 and a cutting blade 18 below the aperture 16. All of the cutting blades 18 face in the same direction, upward in the orientation depicted in FIG. 1. When a food product F is pressed against the panel 12 with a longitudinal force along vector 20 normal to the planar panel 12 and the food F is compelled downward with a vertical force along vector 22, the cutting blades 18 cut into the food F, and portions (not shown) of the food F are sliced off and drop through the apertures 16, thereby "grating" the food product F.

In order to grate the food F with the grater 10, a user typically holds the food F with one hand (not shown), presses the food F against the panel 12 along longitudinal force vector 20 and then slides the food F downward by applying downward force along the vertical force vector 22. The user's second hand H grasps the handle 11 and applies opposing forces along vectors 24 and 26, and as the food F travels along the panel 12 in a downward direction, the food F is "grated." The forces 24 and 26 applied by the second hand H must be translated through the vertically aligned handle 10 to the panel 12. Due to the alignment of the handle 11 above and in the same plane as the panel 12, force vectors 24 and 20 are translated by the handle 11 into a torsional rotational force along vector 28 upon the wrist W and forearm A of the second hand H.

This rotational force 28 results in discomfort and fatigue experienced by a user in the second hand H, wrist W and forearm A areas. Moreover, with the handle being located at the top of the grater 10, the mechanics of a lever are induced. The applied force 20, as translated through the handle 11 to the second hand H and, therefore, to the wrist W and forearm A of the second hand H, increases as the food F moves downward toward the bottom of the panel surface 12. The increase in force along vector 28 as the food F moves downward from the top to the bottom of the panel 12 can be a factor of about ten to one. Thus, the forces along vector 28 compel the second hand H wrist to rotate with a fair amount of power.

FIG. 2 depicts another illustration of the prior art flat panel grater 10 of FIG. 1. As the food F reaches the bottom of the panel 12, the increased vector 20 force acting upon the panel 12 is translated by the handle 11 at the bottom of the second hand H through a pivot point P to the top of the handle 11 as forces away from the second hand H along vector 30. The pivot point P is generally a bottommost point along the palm of the second hand H below the bottom finger that engages the handle 11. The pivot point P acts as a fulcrum, translating the forces along vector 20 into corresponding forces along vector 30, which increase along the handle 11 from bottom to top of the handle 11. The handle 11 thereby acts as a lever, exerting forces along vector 30 upon the fingers D1 through D4 of the second hand H, with the forces 30 increasing relatively from bottom finger D4 to top finger D1. As shown in FIG. 2, top finger D1 has been forced into an open position, and fingers D2 and D3 progressively less open positions. Thus, the handle 11 acting as a lever forces the top of the handle 11 away from the operator's grip, forcing the fingers D1 through D3 to open. Moreover, to resist the forces along vector 30, and to provide the pivot point P, the second hand H wrist W experiences the torsional forces along vector 28. Thus, the forces along vectors 28 and 30 make operating the prior art grater 10 uncomfortable. Operators must overcome the tendencies to have their wrists, hands and arms rotated and their fingers pried open, along with the expected and anticipated force needed to push toward the material being grated with the arm to perform the work.

FIG. 3 illustrates another position for using the prior art flat panel grater 10 of FIGS. 1 and 2. The prior art grater 10 is held with the handle 11 and, therefore, panel 12 aligned horizontally, with the panel 12 extending away from the operator. Forces are applied along vector 40 to the food product F to slide it along the panel 12, and also along vector 42 normal to vector 40 to push the food F into the cutting blades 18. A user's hand H engaging the handle 11 must counter and oppose the forces along vector 42, as translated through the handle 11. Once again, the vector 42 forces become translated to the second hand H through a pivot point Q, wherein the handle 11 operates as a lever. With pivot point Q as the fulcrum, forces applied to the grating panel 12 along vector 42 are translated by the handle 11 into forces along vector 44. Due to the fulcrum at point Q, a constant force 42 as translated to the handle 11 increases as the food F moves further out towards the end of the panel and requires the operator to constantly compensate for the changing loads while moving the food F from one end to the other. These forces are also amplified by the distance away from the grater handle 11 as determined by the location of the material at its panel surface 12. As before in the configuration in FIG. 2, the fingers furthest from the pivot point Q receive the greatest amount of force along vector 44, and the handle 11 will force the fingers D to open and loosen the grip of the hand H upon the handle 11. The forces along vector 42 are also translated by the hand H, wrist W and musculature into rotational torque forces along vector 28, resulting in strain and discomfort on the arm A elbow and the wrist W.

What is needed is a grater that is easy to use, unsupported by a work surface through good ergonomic design. It should be simple to manufacture with a single handle attached at a single point, thereby making cleaning much easier when compared to a prior art grater having a multi-supported handle. It should also be operable while supported by a work surface to increase ease of use.

SUMMARY OF THE INVENTION

A grater and method for grating, wherein a grating panel is connected to a handle with a gripping portion aligned behind the grating surface back side below the top end and above the bottom end and in a common plane with the directional vector, the gripping portion further forming an angle with the downward directional vector, the gripping portion vector angle less than 90 degrees. It is preferred that the angle is selected to translate forces normal to and against the grating surface front side into compressive forces against a user's hand gripping the handle gripping portion. In one embodiment, the connecting means is a steel rod disposed along the panel edge portions and projects from the panel top normal to the planar panel. Some embodiments have stand elements to enable the grater to stand upon a work-surface.

BRIEF DESCRIPTION OF THE DRAWINGS

FIG. 4 is a front perspective illustration of a grater according to the present invention.

FIG. 5 is a back perspective illustration of the grater of FIG. 4.

FIG. 6 is a side perspective illustration of the grater of FIGS. 4 and 5.

FIG. 7 is a bottom perspective illustration of the grater of FIGS. 4 through 6.

FIG. 8 is another side perspective illustration of the grater of FIGS. 4 through 8.

DESCRIPTION OF THE PREFERRED EMBODIMENTS

Figure 1:
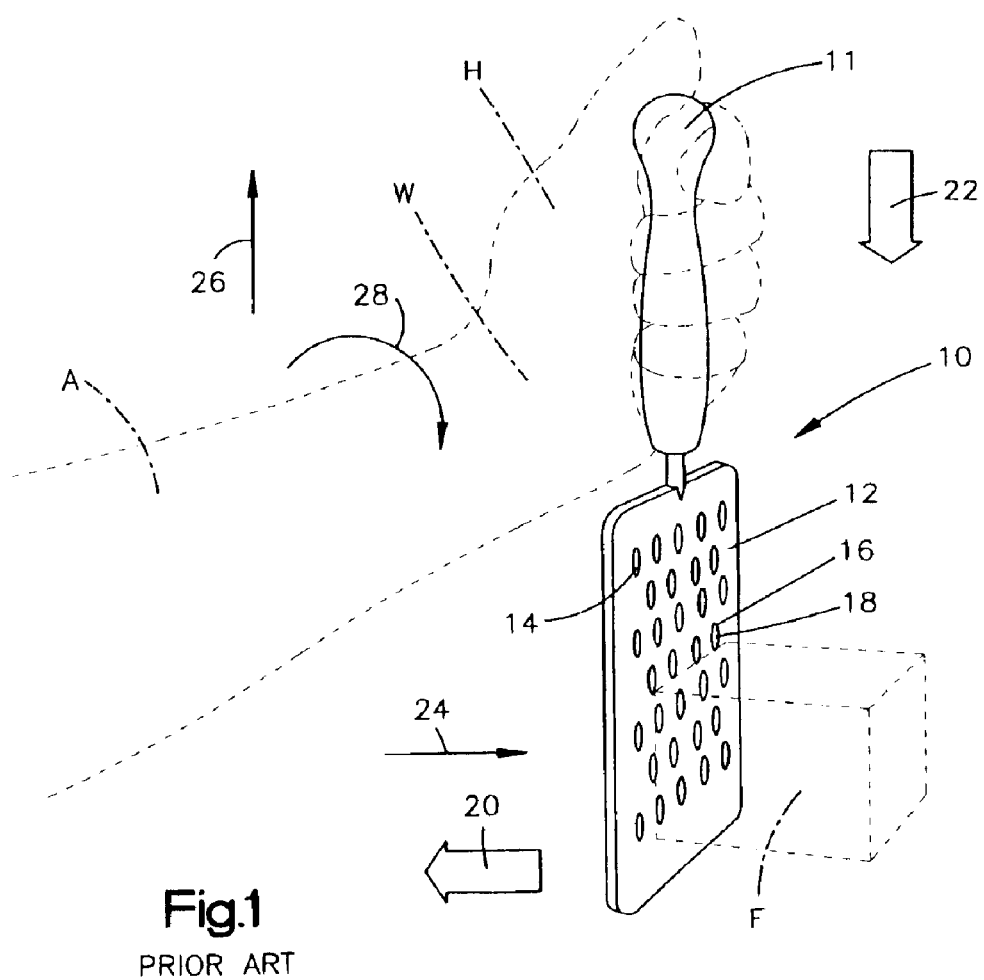
FIG. 1 is a side perspective illustration of a prior art flat panel grater.

FIGS. 4, 5, 6, and 7 provide front, back, side, and bottom views, respectively, of a grater 48 according to the present invention. A planar rectangular flat grating panel 50 is attached to a handle 52 attached by a continuous looped rod 54. The panel forms a plurality of cutting blades 53 and associated apertures 51 for grating foods drawn downward across the panel 50. It is preferred that the panel 50 is formed from stainless steel, although other materials may be apparent to one skilled in the art. Although, in this embodiment, the panel 50 has a flat planar rectangular structure, it may also be curved, or it may be triangular or oval. Other shapes will be readily apparent to one skilled in the art. The rod 54 is preferably made out of stainless steel, although other materials may be apparent to one skilled in the art. The panel 50 is preferably made out of a metallic material, such as stainless steel, and is attached to the rod 54 by wrapping the edges 56 of the panel 50 around the rod 54. The handle 52 is formed about a portion of the rod 54 extending beyond the panel 50. The handle may be a resilient rubber or plastic compound, or a rigid plastic, or even a metallic compound, as is conventional and well known in the art. What is new is the alignment of the handle 52 relative to the panel 50.

After forming a continuous loop around the perimeter of the panel 50, first rod end 62 and second rod end 64 of the steel rod 54 exit the panel 50 at a top aperture 60. The first and second rod ends 62 and 64 then bend about ninety degrees to come together and project away from the panel 50 in a rearward direction. The rod ends 62 and 64 are then incorporated into handle 52, and the handle 52 and rod 54 assembly then bends downward to form a gripping area 70. In contrast to the prior art grater 10 wherein the prior art handle 11 is above and in the same plane as the prior art grating panel 12, according to the present invention, the handle 52 is brought down to the backside of the grater panel 50. By bending the rod ends 62 and 64 ninety degrees at the top of the panel 50 and then incorporating the handle 52, thereby placing the loop in compression at the junction, torsional forces inherent in grating operations are distributed throughout the top of the loop at the plate and down the sides of the panel. While the forces on the loop are torsional, the true force on the operator's hand is compression. The alignment of the handle 52 relative to the panel 50 according to the present invention causes forces applied to the panel 50 to be translated to a user's hand through the handle 52 as a compression force.

There is clearance in the open area 72 between the handle 52 and the backside 74 of the panel 50 for grated material to fall freely. This large clearance area also facilitates easy cleaning of the backside 74 of the panel 50 and cutting blades 53. The size and configuration of the area 72 is a function of two dimension values: (1) a distance 77 between the top of the panel backside 74 and a point 76 where the handle 52 turns downward to form the gripping portion 70; and (2) an angle value 75 between the panel 50 and the handle gripping portion 70. The larger the dimension 77, the smaller the angle 75 value required in order to create an open area 72 area dimension sufficiently large to allow grated material to fall freely and facilitate easy cleaning of the backside 74 and cutting blades 53. In a preferred embodiment of the invention, the dimension 77 is about one inch and the angle 75 is about ten degrees. It is preferred that the angle 75 is greater than zero, in order to facilitate the free fall of grated food material away from the handle 52, and in order to help provide a stable base when using the invention on a work surface, as is explained more fully below.

An advantage of the present invention is the single handle and single handle attachment point design. Although the handle 52 is brought down and aligned in opposition to the grating panel 50, the handle 52 needs only the single attachment to the looped rod 54 at the first and second rod ends 62 and 64. It is preferred that the rod 54 is structurally strong and rigid enough to prevent the panel 50 from bending or deflecting toward the handle gripping portion 70 while grating without the need of any additional structural connections between the panel 50 and handle 52 at the lower part of the panel 50. By eliminating the requirement for additional structural connections, the open area 72 between the handle 52 and the backside 74 of the panel 50 is kept clear of obstructions that may hinder access to the backside 74 of the panel 50. This open design thereby facilitates cleaning of surfaces in the underside open area 72, for example, allowing a sponge freedom to move along the back side of the panel. It also reduces the number of structural elements that can trap food and cause bacteria to grow. Furthermore, the simplicity of the simple panel 50, rod 54 and handle 52 open design, according to the present invention, reduces production costs, enabling the manufacture and sale of inexpensive graters for all income levels. However, although preferred, a single handle and single handle attachment point design is not required to practice the present invention. Alternative embodiments may have multiple handles or a multiple handle attachment point design, or both, as will be readily apparent to one familiar with the prior art or skilled in the art or both.

Figure 9:
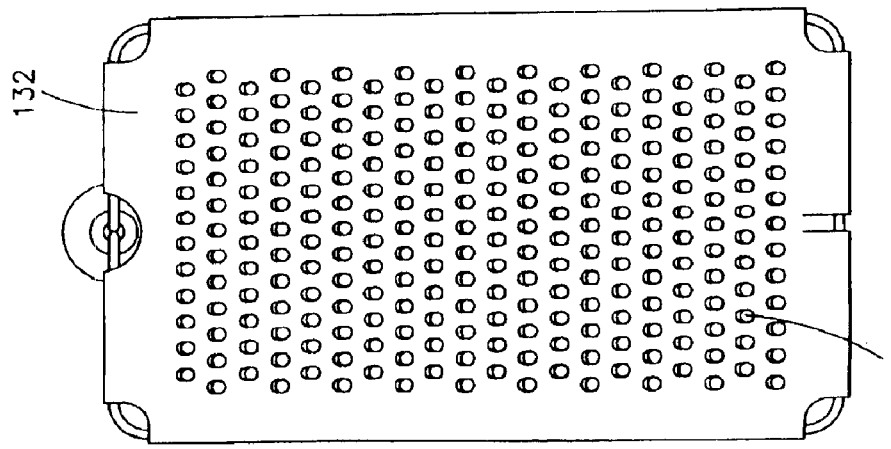
FIG. 9 is a front perspective illustration of a grater panel according to the present invention.
Figure 12:
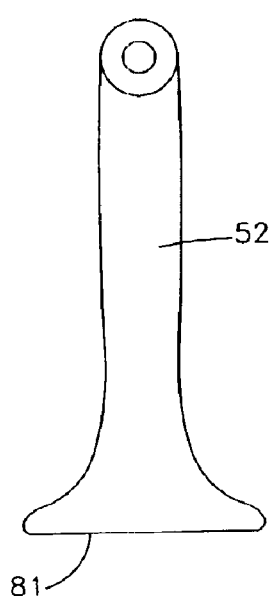
FIG. 12 is a side perspective illustration of a grater handle according to the present invention.
Figure 13:
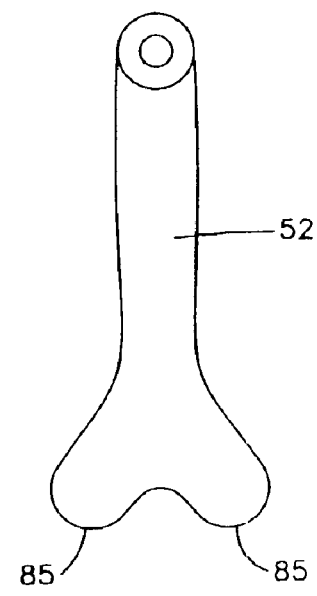
FIG. 13 is a side perspective illustration of another grater handle according to the present invention.
Figure 14:
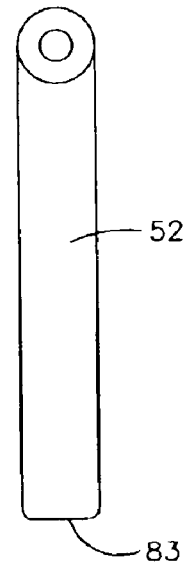
FIG. 14 is a side perspective illustration of another grater handle according to the present invention.

In one embodiment of the invention, the bottom of the handle 52 forms a stand surface 80 parallel to a substantially linear panel stand surface 82 at the bottom of the grating panel 50. The stand surfaces 80 and 82 enable the grater 48 to be placed upon a work surface S, such as a counter or cutting board, which will support the grater 48 during grating, as shown in FIG. 9. A user holds a food product F with one hand while the other hand engages the grater handle 52 and holds the grater 48 down onto the work surface S. It is preferred that the handle stand surface 80 is planar and aligned with the linear panel stand surface 82 in a common plane, and that they have length dimensions 84 and 86 sufficiently large to define a stable base for placement upon the work surface that will resist side-to-side rocking when the grater 48 is used. In a preferred embodiment, the handle base dimension 84 is about 2.75 inches, and the panel base dimension 86 is about 2.625 inches; however, these dimensions are not minimum or maximum values and other values will be readily apparent to one skilled in the art. Similarly, an alternative embodiment of a handle stand surface 81 may be linear, as shown in FIG. 12. Or the handle 52 may taper into a point 83, as shown in FIG. 14. Or discrete work surface contact points 85 may be formed or attached to the handle 52 base, as shown in FIGS. 13, or the panel base 82 (not shown), or both, (not shown). It is preferred that the grater 48 rest upon a work surface S with at least three points of contact, in order to provide a stable base for work surface-supported grating operations. Other configurations will be readily apparent to one skilled in the art.

It is preferred that the angle 92 formed between the panel backside 74 and a work surface S be less than ninety degrees. This will facilitate the free fall of grated material from the grating panel backside 74, rather than the grated material falling upon the panel backside 74 surface, which would be the case if the angle 90 were greater than ninety degrees.

It is also preferred that the angle 90 between the gripping portion of the handle 70 and a work surface S be less than ninety degrees. By keeping angles 90 and 92 less than ninety degrees, the stability of the grater 48 when used upon a work surface S is increased. As is well known in the mechanical arts, where angle 90 is less than ninety degrees, the alignment of the handle bottom portion 70 thus provides structural forces along vector 94 in opposition to forces along vector 96 from the grating of a food product F upon the grating panel 50. Stability is further increased by aligning the planar stand surface 80 parallel with the work surface S. Similarly, where angle 92 is less than ninety degrees, the grating panel 50 provides structural forces along vector 96 in opposition to forces along vector 94.

As discussed earlier, the angle 75 between the panel 50 and the handle gripping portion 70 is about ten degrees, enabling both angles 90 and 92 to be less than ninety degrees. Other values of angle 75 greater than zero may be chosen according to the present invention, and the dimensions of the present embodiment are not exhaustive of the dimensions that may be selected by one skilled in the art. What is important is that the dimension of angle 75 is large enough to support the aforementioned characteristics of grater 48 when placed upon a work surface, yet not so large that the desired functional relationship of the panel 50 to the handle 52 when the grater 48 is used unsupported is unacceptably diminished, as will be discussed supra.

It is preferred that the gripping portion 70 of the handle 52 is molded in an ergonomically comfortable fashion to accept a variety of hand styles and sizes and will accommodate both right and left-handed operators. Accordingly, in one preferred embodiment at the base of the handle 52, the handle material flares outward to form two rest areas 100a and 100b on the sides of the handle. The rest areas 100 are designed to comfortably receive the fingers or thumbs of a user's hand. The rest areas 100 preferably have engagement regions 102 formed along their top surfaces. By placing fingers and thumb on the engagement areas 102, the grater 48 can be firmly held down onto a work surface S while grating.

Figure 2:
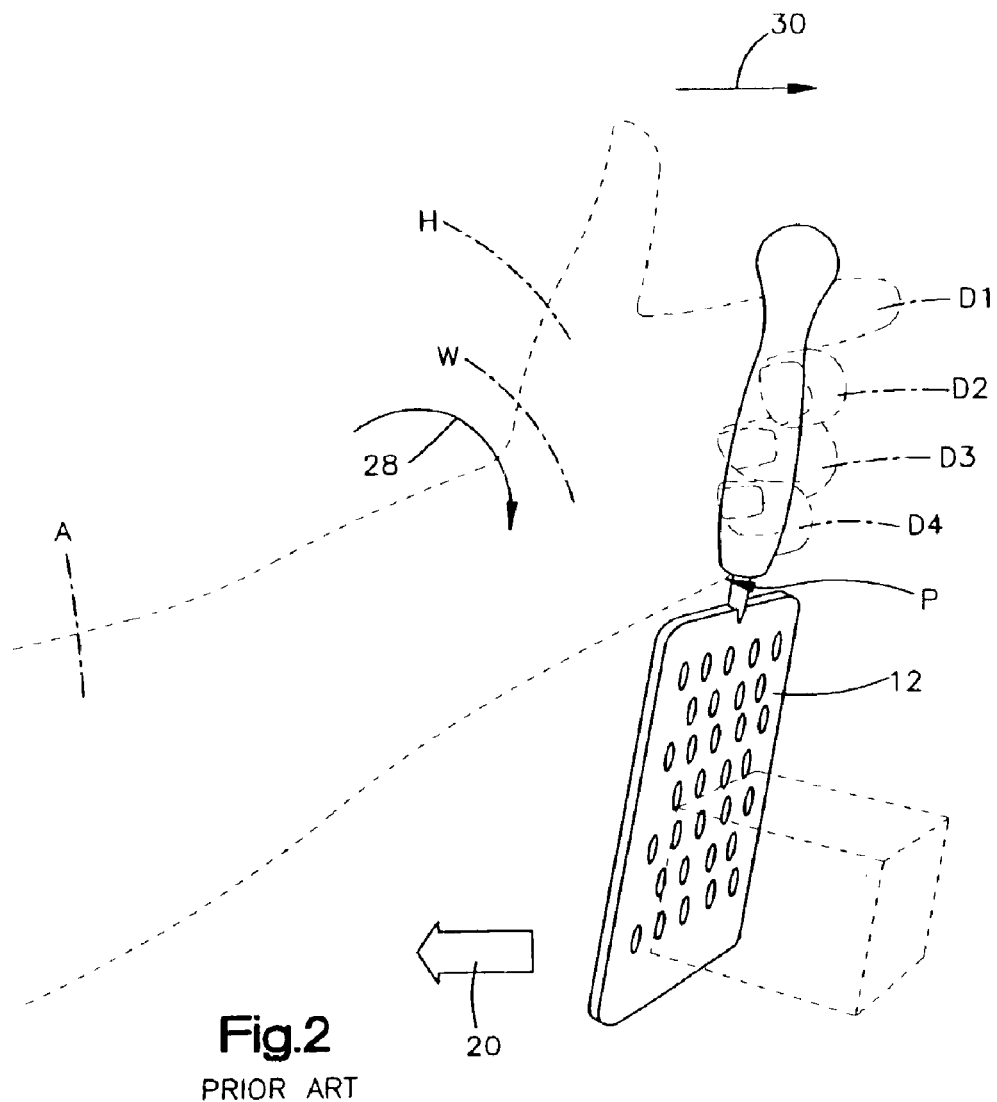
FIG. 2 is another side perspective illustration of the prior art flat panel grater of FIG. 1.
Figure 3:
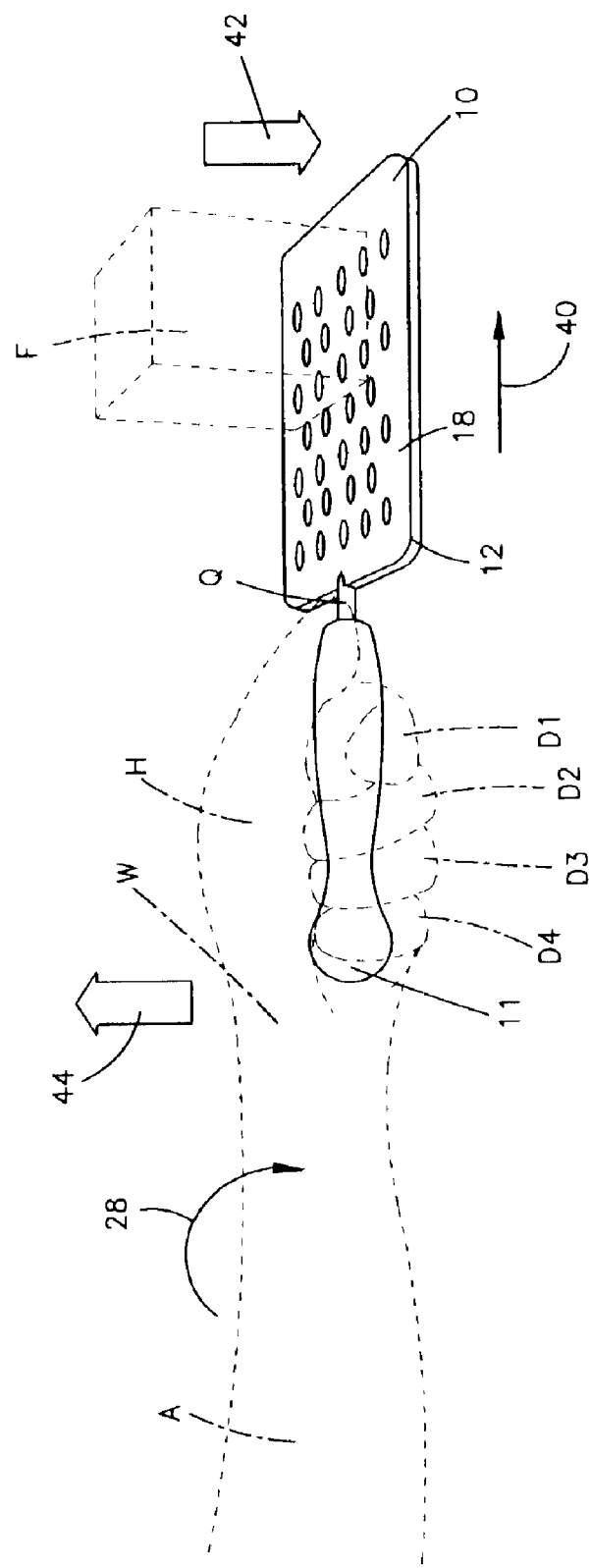
FIG. 3 is another side perspective illustration of the prior art flat panel grater of FIGS. 1 and 2.

What is important in the present invention is the alignment of the handle 52 with the panel 50. The angle value 75 determines the alignment of the panel 50 with respect to the handle gripping portion 70. For example, if angle 75 is zero, the panel 50 and the handle gripping portion 70 are parallel to each other. Where angle 75 is about ten degrees, as in the grater 48 illustrated in FIG. 6, the panel 50 and handle gripping portion 70 are still substantially aligned with each other for the purposes of the present invention. This substantial alignment as taught by the present invention provides for improved interaction of the handle 52 and, therefore, a user's hand H with grating forces when the present invention is used unsupported by a work surface. Referring now to FIG. 8, a grater 48 according to the present invention is shown held by a user's hand H and unsupported by a work surface. The present invention may be held and utilized unsupported in vertical, horizontal or in-between positions. Grating forces 120 generated by the food F compressing against the panel 50 are translated by handle 52 into compressive forces against the palm of the user's hand H. The grating forces 120 travel along the panel 50, and correspondingly along the handle 52, with the travel of the food product F downward along the panel 50. The forces 120 received by the hand H palm pass through the wrist W and into the forearm A along the same direction as vector 120. In contrast to the prior art grater 10, as illustrated in FIGS. 1 and 2, the handle 52 does not translate the forces 120 into torsional forces 28 acting upon the wrist, or leveraged forces 30 that try to open the fingers D. Therefore, the grating forces 120 are experienced by a user's hand H, wrist W and forearm A mostly as a compressive force 120. These compressive forces 120 are much more comfortable and less fatiguing and, therefore, better tolerated by a user compared to the torsional forces 28 and leveraged forces 30, and are more like those naturally occurring from pressing ones hands together.

Downward forces generated by grating motions along vector 122 also act upon the hand H, wrist W and forearm A. The downward forces 122 are translated by the panel 50, handle 52 and hand H to the wrist W and forearm A in a more direct force along vector 123, which is substantially aligned along vector 122. Thus, the downward forces 122 are translated by the grater 48 into downward forces 123 that try to compel the hand H to deflect downward at the wrist W. These forces 123 are much more comfortably resisted and countered by the forearm A than the rotational forces 28 generated by the prior art grater 10. The forces received by the forearm A are ultimately translated to the muscles in the associated elbow and shoulder (not shown). As is well known in the art, these muscles are much larger than the hand H, wrist W and forearm A muscles, which must perform significantly greater amounts of work with the conventional prior art grater 10. The present invention transfers a significantly greater amount of the forces 120 to the larger shoulder muscles compared to the prior art grater 10, which results in greater comfort and less fatigue for a user.

As the value of the angle 75 increases, the alignment of the panel 50 with respect to the handle gripping portion 70 correspondingly diminishes. If angle 75 becomes too large, then some of the grating forces along vector 120 may be translated in undesirable torsional forces upon the hand H, wrist W and forearm A. A preferred value for angle 75 is about ten degrees, and it is preferred that angle 75 range from about zero to about 22.5 degrees to provide a superior alignment of the panel 50 with respect to the handle gripping portion 70 for the purposes of the present invention. Angle 75 may be greater than 22.5 degrees and, in fact, range up to about 179 degrees and still provide for the translation of grating forces 120 into compression forces onto the palm of the hand H. However, as the angle 75 increases, the amount of undesirable torsional forces acting upon the hand H, wrist W and forearm A increase as well. Therefore, although the angle 75 value may be selected from the range of from about zero degrees to about 179 degrees, values over ten degrees are progressively less preferred as the angle 75 value increases.

Figure 11:
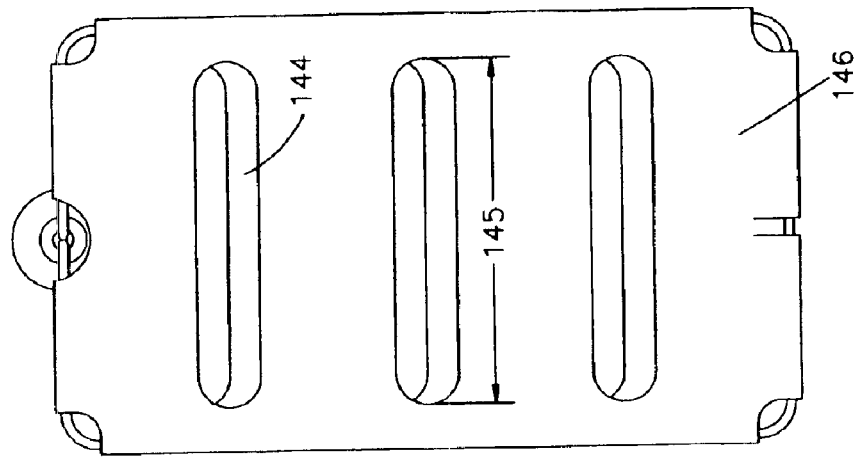
FIG. 11 is a front perspective illustration of another grater panel according to the present invention.
Figure 10:
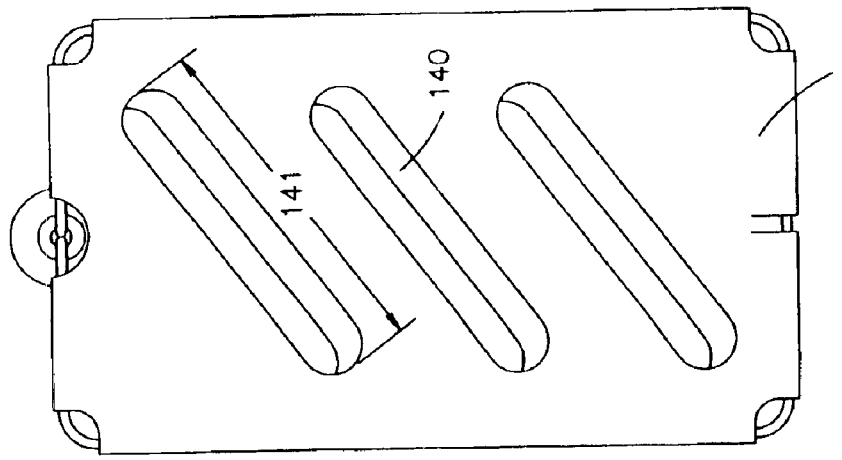
FIG. 10 is a front perspective illustration of another grater panel according to the present invention.

The present invention may accommodate grating elements of various sizes, providing for different sizes of grated food product, as is well known in the art. The cutting blades 53 illustrated thus far are circular-type blades, wherein a diameter 55 defined by the blade 53 and associated aperture 51 is about 0.25 inches. Blade 53 is a "medium" blade and is typically used to grate vegetable products, such as onions and carrots. Smaller circular blades 130 having a diameter of roughly about 2 to 3 mm may also be arrayed upon a grating panel 132, as shown in FIG. 9. The small blade 130 is typically used for finely grating food products, such as hard cheeses. FIG. 10 illustrates a set of three large blades 140, arrayed in a parallel slanted fashion upon a grating panel 142. FIG. 11 shows another array of three large blades 144 arrayed in a parallel horizontal fashion upon a grating panel 146. The large blades 140 and 144 are typically used to produce large grated food products, such as "scalloped" potatoes, and typical blade lengths 141 and 145 may be around 2.0 inches. It is be readily apparent that various blade lengths and configurations may be practiced with the present invention, and the dimensions provided herein are for illustrative purposes only. Other sizes and configurations will be readily apparent to one skilled in the art.

Figure 15:
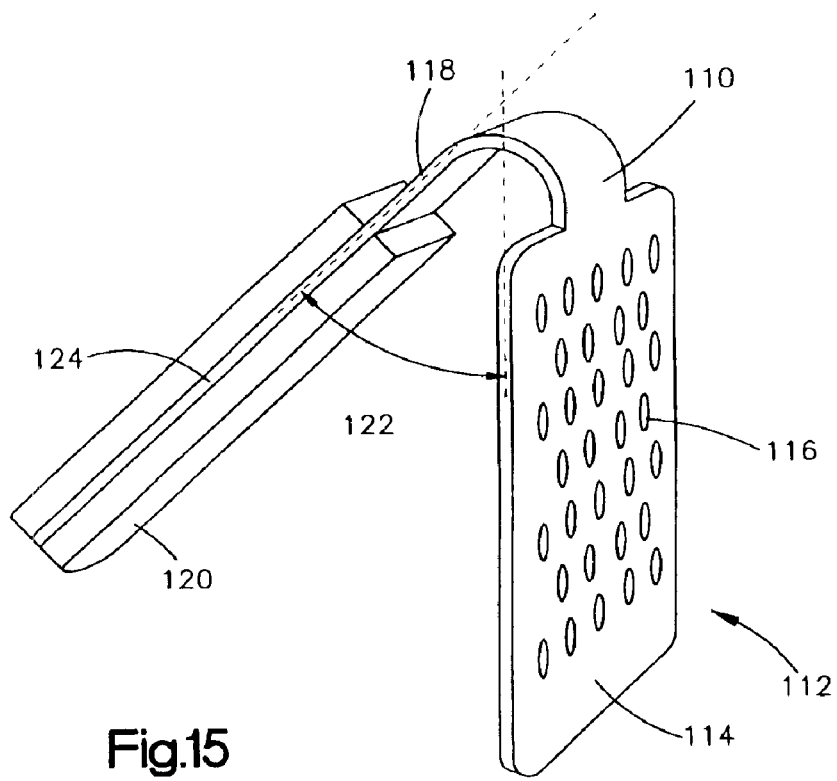
FIG. 15 is a side perspective illustration of another grater according to the present invention.

FIG. 15 illustrates another embodiment 112 of the present invention. A solid planar metal sheet 110 forms a planar rectangular flat grating panel 114 having a plurality of cutting elements 116. The sheet 110 tapers into a narrow projection 118, which is bent downwards to form a planar handle portion 124 that is aligned at an angle 122 with respect to the panel 114. As discussed above with respect to another embodiment of a grater 48 according to the present invention, the angle 122 may range from about zero to 179 degrees; however, smaller values are generally preferred. A handle 120 is formed about the planar handle portion 124. It is preferred that the planar metal sheet 110 and grating panel 114 are formed from stainless steel, although other suitable materials may be apparent to one skilled in the art.

The bottom line is that grating takes energy to counter forces induced while grating. The present invention transfers more of these forces to those muscles in the body that are more apt to dissipate the loads more uniformly and in a larger surface area than with the conventional style prior art graters.

While preferred embodiments of the invention has been described herein, variations in the design may be made, and such variations may be apparent to those skilled in the art of making tools, as well as to those skilled in other arts. The materials identified above are by no means the only materials suitable for the manufacture of the tool, and substitute materials will be readily apparent to one skilled in the art. The scope of the invention, therefore, is only to be limited by the following claims.

What is claimed is:

1. A grater, comprising:
    a grating panel having a grating surface, the grating surface having a substantially planar front side and a back side and a top end and a bottom end;
    the grating surface front side having at least one grating element oriented to grate a workpiece drawn downward along a downward directional grating vector across the grating surface front side from the top end to the bottom end;
    a connecting means attached to the panel top end and projecting in a generally normal rearward orientation relative to the grating vector to a handle connection point spaced at least one inch from the grating vector;
    a handle having top and bottom ends, said handle top end connected to the handle connection point; and
    the handle further forming a curvilinear gripping portion between the handle top and handle bottom ends for gripping by a user's hand;
    wherein the curvilinear gripping portion is spaced at least one inch behind the grating surface back side and aligned below the panel top end and above the panel bottom end and at a handle alignment angle relative to the grating vector, the handle alignment angle less than 22.5 degrees.

2. The grater of claim 1, wherein the grating surface is generally planar and the handle alignment angle is formed in a plane normal to the planar grating surface.

3. The grater of claim 2, wherein:
    the handle, the connection means and the grating panel are substantially rigid; and
    the handle top end is rigidly connected to the handle connection point, wherein the handle alignment and the gripping portion spacing from the grating surface back side are configured to remain substantially constant responsive to forces normal to and against the grating surface front side;
    the grater thereby configured to translate grating forces generated by a workpiece drawn downward across the grating surface front along the grating vector into compressive forces against a user's hand gripping the handle gripping portion.

4. The grater of claim 2, wherein:
    the panel is a planar rectangular metallic sheet having top, bottom and side edge portions;
    the connecting means is a steel rod having a portion disposed between first and second ends, wherein said steel rod portion is disposed along the panel top, bottom and side edge portions, a plurality of said portions attached to said disposed loop portion, and wherein the first and second ends project from the panel top end parallel to each other and substantially normal to the planar panel.

5. The grater of claim 4 wherein the handle bottom end further comprises at least one handle stand element, and the panel bottom end further comprises at least one panel stand element, wherein the at least one handle stand element and the at least one panel stand element are configured to be placed upon a worksurface and enable the grater to stand upon said work-surface.

6. The grater of claim 5 wherein the panel stand element and handle stand element alignment is configured to enable the grater to stand upon a planar worksurface.

7. The grater of claim 6 wherein the panel backside forms a panel angle with the planar worksurface, the panel angle less than about 90 degrees.

8. The grater of claim 4 wherein the handle bottom end further comprises at least one finger rest element, wherein the at least one finger rest element is configured to receive at least one user's finger and enable said at least one user's finger to hold the grater firmly downward onto said worksurface.

9. The grater of claim 1 wherein the handle alignment angle is about ten degrees.

10. A method for grating, comprising the steps of:
    providing a grating panel having a grating surface, the grating surface having a front side and a back side and a top end and a bottom end;
    providing at least one grating element on the grating surface front side;
    orienting the at least one grating element to grate a workpiece drawn downward along a downward directional grating vector across the grating surface front side from the top end to the bottom end;
    providing a connecting means attached to the panel top end;
    the connecting means projecting in a generally normal rearward orientation relative to the grating vector to a handle connection point spaced at least one inch from the grating vector;

connecting a top end of a handle having top and bottom ends to the handle connection point;

providing a curvilinear gripping portion between the handle top end and handle bottom ends for gripping by a user's hand;

aligning the curvilinear gripping portion spaced at least one inch behind the grating surface back side below the panel top end and above the panel bottom end and at handle alignment angle with the grating vector, the handle alignment angle less than 22.5 degrees; and drawing a workpiece downward along the downward directional grating vector across the grating surface front side from the top end to the bottom end, thereby grating the workpiece.

11. The method of grating of claim 10, further comprising the steps of forming the grating surface as a planar surface and forming the handle alignment angle in a plane normal to the planar grating surface.

12. The method of grating of claim 11, wherein the connecting means is a steel rod having a portion disposed between first and second ends, further comprising the steps of:

forming the panel as a planar rectangular metallic sheet having top, bottom and side edge portions;

disposing said steel rod portion along the panel top, bottom and side edge portions;

attaching a plurality of said panel edge portions to said disposed steel rod portion;

projecting the first and second ends from the panel top end parallel to each other and substantially normal to the planar panel; and attaching the handle top portion to the first and second rod ends.

13. The method of grating of claim 12, further comprising the steps of:

forming at least one handle stand element on the handle bottom end; and forming at least one panel stand element on the panel bottom end, wherein the at least one handle stand element and the at least one panel stand element are configured to be placed upon a worksurface and enable the grater to stand upon said worksurface.

14. The method of grating of claim 10, further comprising the step of:

forming the handle, the connection means and the grating panel substantially rigid;

rigidly connecting the handle top end to the handle connection point, wherein the handle alignment angle and the gripping portion spacing from the grating surface back side are configured to remain substantially constant responsive to forces normal to and against the grating surface front side; and the grater translating grating forces normal to and against the grating surface front side generated by a workpiece drawn downward across the grating surface front along the grating vector into compressive forces against a user's hand gripping the handle gripping portion.

15. The method of claim 10 wherein the handle alignment angle is about ten degrees.

* * * * *